United States Patent
Chukka et al.

(10) Patent No.: US 11,417,021 B2
(45) Date of Patent: Aug. 16, 2022

(54) SYSTEM AND METHOD FOR COLOR DECONVOLUTION OF A SLIDE IMAGE TO ASSIST IN THE ANALYSIS OF TISSUE SPECIMEN

(71) Applicant: Ventana Medical Systems, Inc., Tucson, AZ (US)

(72) Inventors: Srinivas Chukka, San Jose, CA (US); Zhou Lan, Raleigh, NC (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

(21) Appl. No.: 16/779,274

(22) Filed: Jan. 31, 2020

(65) Prior Publication Data

US 2020/0167965 A1    May 28, 2020

Related U.S. Application Data

(63) Continuation of application No. PCT/EP2018/070924, filed on Aug. 2, 2018.
(Continued)

(51) Int. Cl.
*G06T 7/90* (2017.01)
*G06T 7/00* (2017.01)
(Continued)

(52) U.S. Cl.
CPC .............. *G06T 7/90* (2017.01); *G06T 7/0012* (2013.01); *G06V 10/143* (2022.01); *G06V 10/40* (2022.01);
(Continued)

(58) Field of Classification Search
None
See application file for complete search history.

(56) References Cited

FOREIGN PATENT DOCUMENTS

| JP | 2016533475 | 10/2016 |
|---|---|---|
| WO | 2015/044419 | 4/2015 |

(Continued)

OTHER PUBLICATIONS

Li, X., & Plataniotis, K. N. (2015). Circular Mixture Modeling of Color Distribution for Blind Stain Separation in Pathology Images. IEEE Journal of Biomedical and Health Informatics, 21(1), 150-161. https://doi.org/10.1109/jbhi.2015.2503720 (Year: 2015).*

(Continued)

*Primary Examiner* — Vu Le
*Assistant Examiner* — Courtney Joan Nelson
(74) *Attorney, Agent, or Firm* — Kilpatrick Townsend & Stockton LLP (57) ABSTRACT

A tissue analysis system and method for the spectral deconvolution of a RGB digital image obtained from a stained biological tissue sample, by estimating the stain component images that are obtained from a staining system configuration, where the reference stain vectors are assumed to be sampled from a known color distribution. The prior knowledge of stain variability of the staining system is adopted as initial reference stain vectors and statistical distribution of their variability. Based on the initial reference stain vectors distribution, the tissue analysis system determines both the reference stain vectors and stain component images of the input image. The image is then deconvoluted based on the reference stain vectors and stain component images.

18 Claims, 3 Drawing Sheets

Related U.S. Application Data (60) Provisional application No. 62/541,628, filed on Aug. 4, 2017.

(51) Int. Cl.
  G06V 10/40 (2022.01)
  G06V 10/143 (2022.01)
  G06V 20/69 (2022.01)

(52) U.S. Cl.
  CPC .... G06V 20/69 (2022.01); *G06T 2207/10024* (2013.01); *G06T 2207/30024* (2013.01)

(56) References Cited

FOREIGN PATENT DOCUMENTS

| WO | WO-2015124777 A1 * | 8/2015 | ........... G06K 9/0014 |
|----|--------------------|--------|-------------------------|
| WO | WO-2016016306 A1 * | 2/2016 | ............... G06T 7/90 |

OTHER PUBLICATIONS

Andreas Karsnas: Image Analysis Methods and Tools for Digital Histopathology Applications Relevant to Breast Cancer Diagnosis, Digital Comprehensive Summaries of Uppsala Dissertations from the Faculty of Science and Technology 1128. 129 pp. Uppsala: Acta Universitatis Upsaliensss. (Year: 2014) ISBN: 978-9-15-548889-5, Jan. 1, 2014 (Jan. 1, 2014) (Year: 2014).*

Andreas Karsnas, Image Analysis Methods and Tools for Digital Histopahtology Applications Relevant to Breast Cancer Diagnosis, Digital Comprehensive Summaries of Uppsala Dissertations from the Faculty of Science and Technology 1128, Apr. 11, 2014, 1-130, Uppsala University, SE.

International Search Report and Written Opinion, dated Nov. 29, 2018, in corresponding PCT/EP2018/070924, filed Aug. 2, 2018, pp. 1-23.

Li, Xingyu; Plataniotis, Konstantnos N., Circular Mixture Modeling of Color Distribution for Blind Stain Separation in Pathology Images, IEEE Journal of Biomedical and Health Informatics, Jan. 1, 2017, 150-161, vol. 21, No. 1.

Mochiki, et al., *Robust Human Detection in a Complicated Background using Multiple Gaussian Mixture Skin Models*, Waseda University, IEICE Technical Report Oct. 2005, vol. 105, No. 375 (JP language), English Abstract attached.

Niethammer, et al., Appearance Normalization of Histology Slides, Mach Learn Med Imaging. 2010 ; 6357; 58-66. doi:10.1007/978-3-642-15948-0_8, available in PMC Oct. 28, 2014.

Ruifrok, et al., Quantification of histological staining by color deconvolution. *Anal Quant Cytol Histol* 23: 291-299,2001.

European Application No. EP18752711.4 received an Office Action dated Jan. 5, 2022, 10 pages.

\* cited by examiner

SYSTEM AND METHOD FOR COLOR DECONVOLUTION OF A SLIDE IMAGE TO ASSIST IN THE ANALYSIS OF TISSUE SPECIMEN

CROSS REFERENCES TO RELATED APPLICATIONS

The present application is a continuation of International Application PCT/EP2018/070924, entitled "System And Method For Color Deconvolution Of A Slide Image To Assist In The Analysis Of Tissue Specimen" and filed Aug. 2, 2018, which claims priority to U.S. Provisional Application No. 62/541,628, filed Aug. 4, 2017. Each of these applications is hereby incorporated by reference in its entirety for all purposes.

TECHNICAL FIELD

The present disclosure generally relates to imaging systems and methods in digital pathology for cancer tissue diagnostics. More particularly, the present disclosure relates to color deconvolution of H&E stained slide images that are digitally captured as multi-colored channel images, such as red, green, and blue (RGB) channel images for simultaneous estimation of the stain component images and identification of physiologically plausible reference stain vectors of the assays.

BACKGROUND

In the analysis of biological specimens such as tissue sections, blood, cell cultures and the like, biological specimens are mounted on slides and stained with one or more combinations of stain and biomarkers, and the resulting tissue slide is viewed or imaged for further analysis. A tissue slide may include biological specimens such as tissue sections from human subjects that are treated with a stain containing a fluorophore or chromogen conjugated to an antibody which binds to protein, protein fragments, or other targets in the specimens.

Observing the tissue slide enables a variety of processes, including diagnosis of disease, assessment of response to treatment, and development of new drugs to fight diseases. Upon scanning the tissue slide, multiple channels of image data including color channels are derived, with each observed channel comprising a mixture of multiple signals.

One of the most common examples of assay staining is the Hematoxylin-Eosin (H&E) staining, which includes two stains that help identify tissue anatomy information. The H-stain mainly stains the cell nuclei with a generally blue color, while the E-stain acts mainly as a cytoplasmic generally pink stain. A special staining assay may identify target substances in the tissue based on their chemical character, biological character, or pathological character.

An immunohistochemistry (IHC) assay includes one or more stains conjugated to an antibody that binds to protein, protein fragments, or other structures of interest in the specimen, hereinafter referred to as targets. The antibodies and other compounds (or substances) that bind a target in the specimen to a stain, are referred to herein as biomarkers.

For an H&E or a special staining assay, biomarkers have a fixed relationship to a stain (e.g., Hematoxylin counterstain), whereas for an IHC assay, a choice of stain may be used for a biomarker to develop and create a new assay. Biological specimens are prepared according to an assay before imaging. Upon applying a single light source, a series of multiple light sources, or any other source of input spectra to the tissue, the tissue slide can be assessed by an observer, typically through a microscope, or image data can be acquired from the assay for further processing.

In such an acquisition, multiple channels of image data, for example color channels, are derived, with each observed channel comprising a mixture of multiple signals, where each signal represents the particular stain expression in the tissue and the number of signals corresponds to the number of stains used to stain the tissue processing of this image data can include methods of color deconvolution also referred to as spectral unmixing, color separation, etc., that are used to determine a local concentration of specific stains from the observed channel or channels of image data. For image data processed by automated methods, depicted on a display, or for a tissue slide viewed by an observer, a relation may be determined between the local appearance of the stained tissue and the applied stains and biomarkers to determine a model of the biomarker distribution in the stained tissue.

Generally, color deconvolution is used to determine a concentration of specific stains within an observed channel or multiple channels. Each pixel of a scanned image is represented by a vector of image values, or a color vector, and each stain corresponds to a reference stain vector, also referred to herein as reference vector and is known as a reference spectrum. The local concentration of the stain at a pixel is represented by a scaling factor of a reference stain vector.

However, according to conventional color deconvolution methods, the color vector for a pixel that contains multiple co-located stains with different concentrations is presumed to be a linear combination of the reference spectra of all the present stains. Typically, fluorescence imaging color channels directly provide the image vector and reference spectra. In brightfield imaging, light intensities emitted by the stained tissue are transformed into an optical density space, which is a logarithmic transformation of the captured RGB image data, with mixing of different stains being as well represented by a linear weighted combination of the contributing reference spectra.

The deconvolution process extracts stain-specific channels to determine local concentrations of individual stains using reference spectra that are well-known for standard types of tissue and stain combinations. However, the reference spectra for pure stains tend to vary with tissue type, controlled and uncontrolled process parameters during staining and tissue fixation. For instance, there are always variations within a tissue type based on age of the tissue, age of the stain, how the tissue was stored, dehydrated, fixed, embedded, cut, etc. These variations can influence how a stain will appear, and can result in unwanted artifacts in the results of an unmixing process. As a result, the conventional methods of representing the color decomposition process as a linear matrix equation with assumed fixed and known reference vectors may not necessarily identify physiologically plausible stain component images within the tissue slide. When the reference vectors are assumed to be not known apriori, the problem is a non-linear optimization problem where the reference stain vectors along with the stain component images need to be estimated.

This concern becomes apparent when deconvoluting brightfield images containing 3 color (RGB) channels into two-channel, H & E component images. Similarly, this concern is further exacerbated when deconvoluting multi-channel fluorescent images, assuming known and fixed reference vectors, containing several filter receiver channels (for example, in one fluorescent scanner, 16 channels) into the corresponding stain component images.

A common approach to solve the color deconvolution problem assumes that the reference vectors are fixed and known. As a result, the color deconvolution problem is reduced to solve a linear matrix equation at each pixel, in order to identify physiologically plausible stain component images. Reference is made to the following publications:

Ruifrok, Arnout C., and Dennis A. Johnston. "Quantification of histochemical staining by color deconvolution." Analytical and quantitative cytology and histology 23.4 (2001): 291-299.

Niethammer, Marc, et al. "Appearance normalization of histology slides." International Workshop on Machine Learning in Medical Imaging. Springer Berlin Heidelberg, 2010.

However, in the situation where both the reference stain vectors and the stain component images are not known and both need to be estimated, the color deconvolution equation is non-linear. Conventional solutions to solve the non-linear equation may be classified in two different types. The first type is to use mathematical variants of non-negative matrix factorization (NNMF) methods where in an iterative manner, both the mathematically optimal solution of reference vectors and the stain component images are output. The second type is to make use of image analysis methods to first segment the image to approximately identify the cellular object outlines and the tissue background from which the reference vectors are estimated and subsequently to compute the stain component images by solving the linear equation. Multiple variants of this approach have been proposed in the literature. In either case, the mathematical solution to the non-linear problem is non-unique and thus the solution obtained is neither constrained nor guaranteed to estimate and be consistent with the reference vectors that correspond to the physical staining process.

Prior to the advent of the present disclosure, there has been no approach that concurrently estimates the unique color reference vectors and stain component images from an image of a tissue slide.

SUMMARY

The present disclosure addresses the foregoing concern by providing, inter alia, a tissue analysis system and method for deconvoluting a tissue image by estimating the stain component images that are obtained from a staining system configuration where the reference stain vectors are assumed to be sampled from a known color distribution. The present tissue analysis system includes a digital storage medium which stores digitally encoded instructions that are executable by a processor for implementing the method of the present disclosure.

The prior knowledge of stain variability of the staining system is adopted as initial reference stain vectors and statistical distribution of their variability. In one embodiment, both the reference stain vectors and the stain component images of the input image are determined based on the initial reference stain vectors distribution. The image is then deconvoluted into at least two-channel constituent stain component images, based on the reference stain vectors and stain component images.

Prior knowledge of stain variability can be successfully adopted by assigning a Gaussian prior on transferring probability (as a reference vector in matrix framework). Subsequently, the Gaussian prior may be iteratively applied in two successive E step then M step, using an Expectation-Maximization (EM) model, until convergence is attained.

According to another embodiment artificial latent variables are defined to include an artificial latent variable residue, Resi, as a cross-product of a hematoxylin vector and an eosin vector, in order to generate a vector that is independent of the first and second stain vectors.

In a specific, exemplary embodiment, the present disclosure provides for a tissue analysis system and a method for the spectral/color deconvolution of a pixelated RGB digital image obtained from a stained biological H&E tissue sample. The deconvolution method includes inputting image data obtained from the biological tissue sample and reading reference data from a memory, wherein the reference data may be descriptive of the stain color of each pixel.

Each pixel of the inputted image may be decomposed into unsupervised latent variables to which a Gaussian prior may be applied, in order to supervise the deconvolution of the image. Artificial latent variables are then allocated to suspect heterogenous pixels contained within the image, and two supervised constituent deconvoluted H&E images (or components) are rendered for analysis or further processing.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The various features of the present disclosure and the manner of attaining them will be described in greater detail with reference to the following description, claims, and drawings wherein:

It will be appreciated that for simplicity and clarity of illustration, reference numbers may be reused among the figures to indicate corresponding or analogous features.

DETAILED DESCRIPTION

Figure 1:
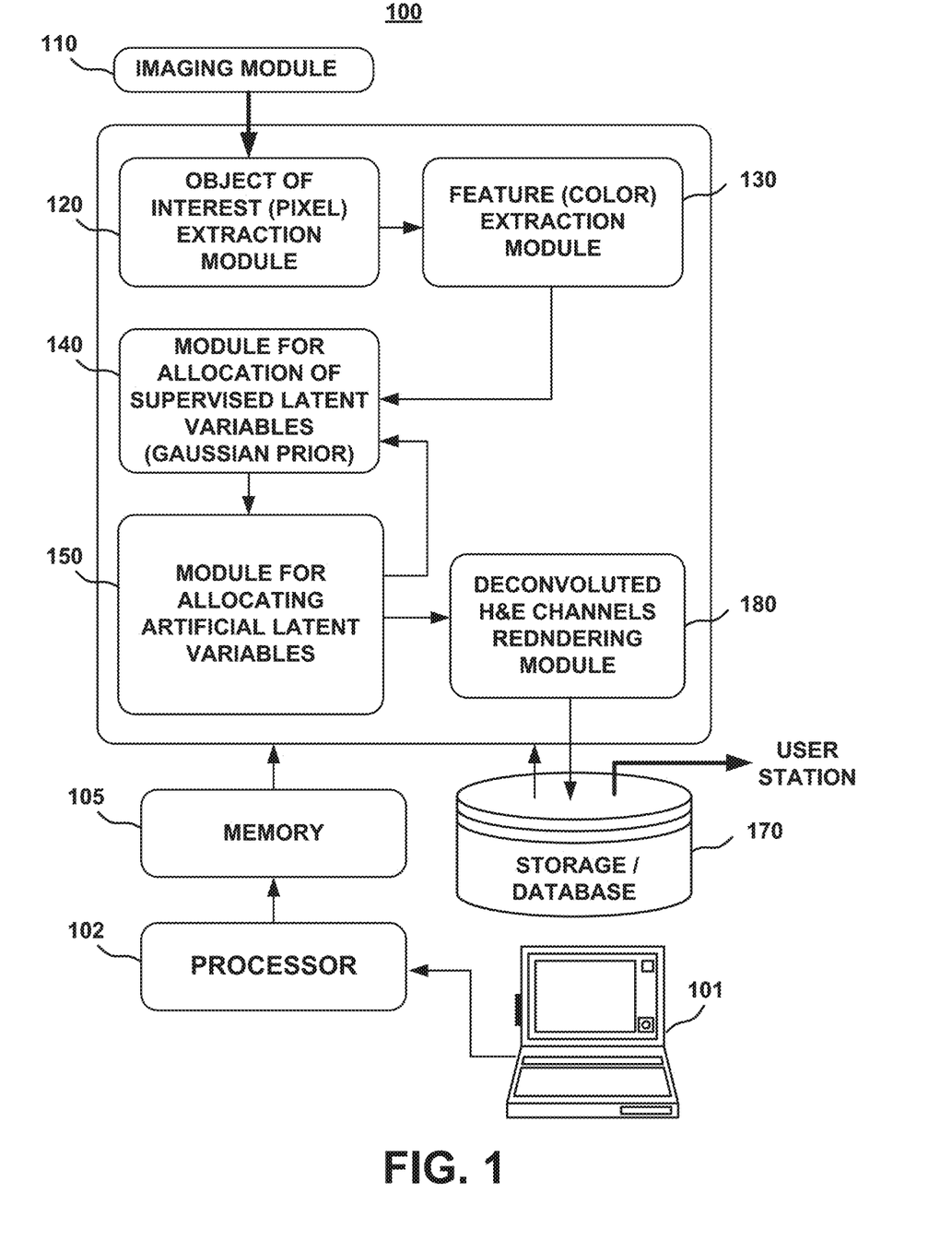
FIG. 1 depicts a computer-based automated tissue analysis system for image deconvolution, in accordance with an exemplary embodiment of the subject disclosure.

FIG. 1 depicts a computer-based automated analysis system 100 for deconvoluting a three-channel stained slide digital RGB tissue image 210 (FIG. 3) into two-channel components images, such as an H-channel image 290 and an E-channel image 291 (FIG. 3), in accordance with an exemplary embodiment of the subject disclosure. The analysis system 100 may be suitable for analyzing biological specimen, for example, tissue provided on a slide. As used herein, the term "tissue specimen" encompasses any type of biological specimen such as tissue sections, blood, cell cultures, and like biological samples, that can be mounted on a slide.

The tissue image may for example be a multi-channel color image, such as an RGB (or in any equivalent color space such as CYMK, Lab, YUV HSV etc.) or other multi-channel color image of the tissue sample. In particular, the image data may comprise a pixel matrix comprised of a plurality of pixels representative of the tissue image. The multi-channel color image may comprise a plurality of color channels, such as 3 to several (16, for example in a fluorescent system) color channels. As such, each pixel may comprise color information for each color channel, e.g., for each of red, green, and blue channels of an RGB image.

The analysis system 100 may store and process image data representative of the tissue image. As used herein, the term "image data" encompasses raw image data of the pixels acquired from the biological tissue sample, such as by means of an optical sensor or a sensor array, generally referred to herein as imaging module 110. The analysis system 100 may comprise a tissue image data storage module or database 170 that stores a plurality of pixels representative of the RGB tissue image 210.

The database 170 may store color data, (e.g., color data indicative of a color of the stains). Such color data are also referred to as "reference data." The color data may be descriptive of a single frequency or a characteristic spectra profile of the stain. The imaging module 110 may store color data for each of a plurality of stains. In the present context, the term "stain" may be understood in the broad sense of any type of marker such as an antibody, dye, or stain suitable to mark,(i.e., "stain," biomarkers in a tissue). In addition, the verb "to stain" is not limited to the application of a stain to a tissue, but may likewise comprise exposing the tissue to any type of markers such as antibodies or dyes to mark biomarkers in the tissue.

In the present disclosure, the term "marker" may be understood in the sense of a stain, dye, or a tag that allows a biomarker to be differentiated from ambient tissue and/or from other biomarkers. The term "biomarker" may be understood in the sense of a tissue feature, such as the presence of a particular cell type, for instance immune cells, and more particularly, a tissue feature indicative of a medical condition. The biomarker may be identifiable by the presence of a particular molecule, for instance a protein, in the tissue feature.

The tag may be stained or dyed. The tag may be an antibody, e.g., an antibody having an affinity to a protein of a particular biomarker. A marker may have an affinity to a particular biomarker, e.g., to a particular molecule, protein, cell structure, or cell indicative of a particular biomarker. The biomarker to which a marker has an affinity may be specific or unique for the respective marker. A marker may mark tissue, i.e., a biomarker in the tissue, with a color. The color of tissue marked by a respective marker may be specific or unique for the respective marker.

The analysis system 100 may comprise a plurality of processing modules or logical instructions that can be executed by computer 101 or processor 102. A "module" as understood herein can be implemented as hardware modules, or as software modules that encompass a software, instruction codes, hardware module, or a combination thereof, which provides the respective functionality, and which can be stored in memory 105 (or in another memory that may be accessible by the processor 101). Besides processor 102 and memory 105, computer 101 can also include user input and output devices such as a keyboard, mouse, stylus, and a display/touchscreen. As it will be explained in the following discussion, processor 102 can execute logical instructions stored on memory 105, perform image analysis and other quantitative operations, resulting in an output of results to a user operating computer 101 or via a network.

In one embodiment, the imaging module 110 may provide image data from one or more scanned slides to, for example, memory 105 or database 170. The image data may include an image, as well as any information related to the specific stains used and the imaging platform on which the image was generated. The present disclosure may be applicable to a set of RGB digital images 210 (FIG. 2) that show stained tissue sections. Although the slides are described herein to be stained with Hematoxylin and Eosin (H&E) for the purpose of illustration, it should be clear that other staining methods may alternatively be used, such as: special stains, immunohistochemistry (NC), in-situ-hybridization (ISH), or other staining technologies with brightfield chromogens or fluorescent markers. The RGB digital images 210 can be created in brightfield or fluorescence imagers that create fieldview images, large-area scans, or whole-slide scans.

An object of interest extraction module 120 may be executed to facilitate the follow up automated image analyses for identification and extraction of the objects of interest. In one embodiment, the objects of interest include all the cells within the tissue specimen. It should be understood that while the present disclosure refers to tissue cells as objects of interest, the disclosure is not limited to tissue cells and may be extended, for example, to a selection of cells on the tissue, like tumor cells, immune cells, or stromal cells, or to include further objects of interest depicted in a digital image like blood vessels, lymph vessels, tumor glands, airways, lymphatic aggregates, and other objects.

A feature extraction module 130, may be executed to sample and construct the probability distribution for the reference vectors of different stains, in order to facilitate feature extraction by using, for example, known or available image processing methods to extract and measure the features of each individual cell. Exemplary cell features to be extracted may include the cell coordinates (or positions), staining intensity, staining response, stain color, etc.

In one embodiment, the color appearance on the RGB tissue slides is due to two different sources: stain reference color vectors that reflect the staining system variability, and stain component images that reflect the underlying biological tissue variability, as reflected in the following equation, wherein each element of the following equation represents a matrix:

$$[R, G, B \text{ tissue slide}]=[\text{color vectors for } H, \text{ color vectors for } E]\times[\text{stain component image for } H, \text{ stain component image for } E]$$

The staining system variability can be from the typical system to system variability in the staining platform, such as the specific batch of reagents used, choice of fixation time, temperature and other system parameters, and the tissue slide scanner used to digitize the tissue slide. Thus, the variability in the staining process induces a random color variation of the reference stain vectors within some specific bounds, which are specific to a particular staining system configuration.

Although the reference stain vectors are not known, for a specific staining system configuration the reference stain vectors in a particular tissue slide can be assumed to be randomly sampled observation from a known color vector probability distribution. For a given staining system and the reagents used (such as VENTANA® Symphony® or VENTANA HE® 600) and a particular tissue slide scanner (such as VENTANA® iScan® HT or iScan Coreo®) the color vector distribution can be experimentally measured and characterized from a training sample set of several tissue slides stained and digitized under varying conditions.

Equivalently, the reference color vectors are manually sampled from a set of cellular and tissue background in several tissue slides and fit a statistical parametric probability model to the sampled pixel data. For example, for a 3-dimensional color vector (RGB) for a stain, the corresponding color distribution could be a 3-dimensional Gaussian distribution either in the RGB or the optical density space.

To this end, a module 140 uses prior knowledge of stain variability that may be stored in a storage or database 170. Since the manufacturer's characteristics of the stains used to generate the RGB digital image 210 are known (or acquired through experimentation), these characteristics may be stored in storage or database 170, and are used, as parameter setting of prior Gaussian distribution by module 140. Prior knowledge of stain variability can be successfully adopted by assigning Gaussian prior on transferring probability (as a reference vector in matrix framework).

This feature represents a novel departure from the standard Latent Variable Decomposition (LVD) model. The analysis system 100 decomposes the object data into unsupervised latent variables. In other terms, the analysis system 100 builds color deconvolution on the RGB digital image 210 (FIG. 2) by implementing the probabilistic LVD model. The LVD color decomposition model can be expressed by the following equation (1):

$$P_n(f) = \sum_z P(f|z)P_n(z) \quad (1)$$

where $P_n(f)$ represents the probability of drawing a feature f (e.g., the feature may be the optical density transformation of the pixel color (R, G, B)) in the $n^{th}$ data (pixel specifically), and where P(f|z) is column-specific conditional probability given latent variable z (H and E, specifically) and $P_n(z)$ is the probability of a latent variable for a the $n^{th}$ data (pixel). In here, $P_n(z)$ reflects the reference stain vectors and $P_n(z)$ is proportional to the stain component image at an arbitrary nth pixel location. And $P_n(f)$ is proportional to the optical density representation of the pixel RGB intensity values. For an image of MN, the value of n ranges from 1 to M*N, and the index z, latent variable of a reference stain and in a H&E image (as there are two channels (H and E)) z takes two discrete values of 1 and 2.

Based on the foregoing LVD model equation (1), module 140 may assign Gaussian prior to the probability of drawing a feature f, P(f|z), as expressed by the following equation (2):

$$P(f|z) \sim N(\tau_{z,f}, q_{z,f}) \quad (2)$$

where $T_{z,f}$ and $q_{z,f}$ represent the means and standard deviations of the Gaussian distribution. This distribution is representative of the reference color distributions from a particular staining configuration. To this end, and in order to statistically estimate the latent variables, module 140 may iteratively apply the Gaussian prior in two successive steps, using an Expectation-Maximization (EM) algorithm, according to the following equations (3) and (4):

E-step:

$$P_n(z|f) = \frac{P_n(z)P(f|z)}{\sum_z P_n(z)P(f|z)} \quad (3)$$

M-step:

$$P_n(z) = \frac{\sum_f V_{fn} P_n(z|f)}{\sum_z \sum_f V_{fn} P_n(z|f)} \quad (4)$$

$$P(f|z) = \frac{1}{2}\left(\tau_{z,f} + q_{z,f}^2 \rho_z + \sqrt{4\sum_n \gamma V_{fn} P_n(z|f) \times q_{z,f}^2 \rho_z + (\tau_{z,f} + q_{z,f}^2 \rho_z)^2}\right)$$

These two steps will continue to be iteratively applied, starting with the E-step, until convergence is attained, at which time the iterations are terminated. $P_n(z|f)$ is an estimate of the reference stain vectors.

In the foregoing analysis, the standard latent variable decomposition assumes that the data are homogeneous and can be described only as a linear combination of the reference stain vectors, omitting individual regions (also referred to as aberrations or heterogenous objects) 300 (FIG. 3), that cannot be readily classified as either hematoxylin-stains or eosin-stains. For example, these regions correspond to the transparent glass background on a tissue slide or white spaces that correspond to the fat and lumen in the tissue. To address this concern, a module 150 of the analysis system 100 allocates artificial latent variables to the suspect heterogenous objects 300. The artificial latent vatable corresponds to a color that cannot be described as a linear combination of any of the reference colors.

To this end, and based on the foregoing equations (1) and (2), module 150 creates an artificial latent variable residue or 'Resi' whose reference probability is defined as a cross-product of a hematoxylin (H) vector and an eosin (E) vector, in order to generate a vector that is independent of both the hematoxylin (H) vector and the eosin vector €. The cross-product of H and E vectors by the following equations (5) and (6):

$$\overline{P}(f|z = Resi) \propto P(f|z = H) \times P(f|z = E) \quad (5)$$

$$\begin{pmatrix} R_{input} \\ G_{input} \\ B_{input} \end{pmatrix}_{3\times N} = (H; E; Resi)_{3\times 3} \begin{pmatrix} R_{output} \\ G_{output} \\ B_{output} \end{pmatrix}_{3\times N} \quad (6)$$

With the constraint that Resi∈N (H, E).

A deconvoluted H&E channels rendering module 180 may finalize the rendering of the H-channel image 290 and the E-channel images 291, and may transmit the rendered H&E images 290, 291 to the storage/database 170 for storage or further processing. The rendered H&E images 290, 291 may then be accessed by either a local or remote user station, server, or network.

Figure 2:
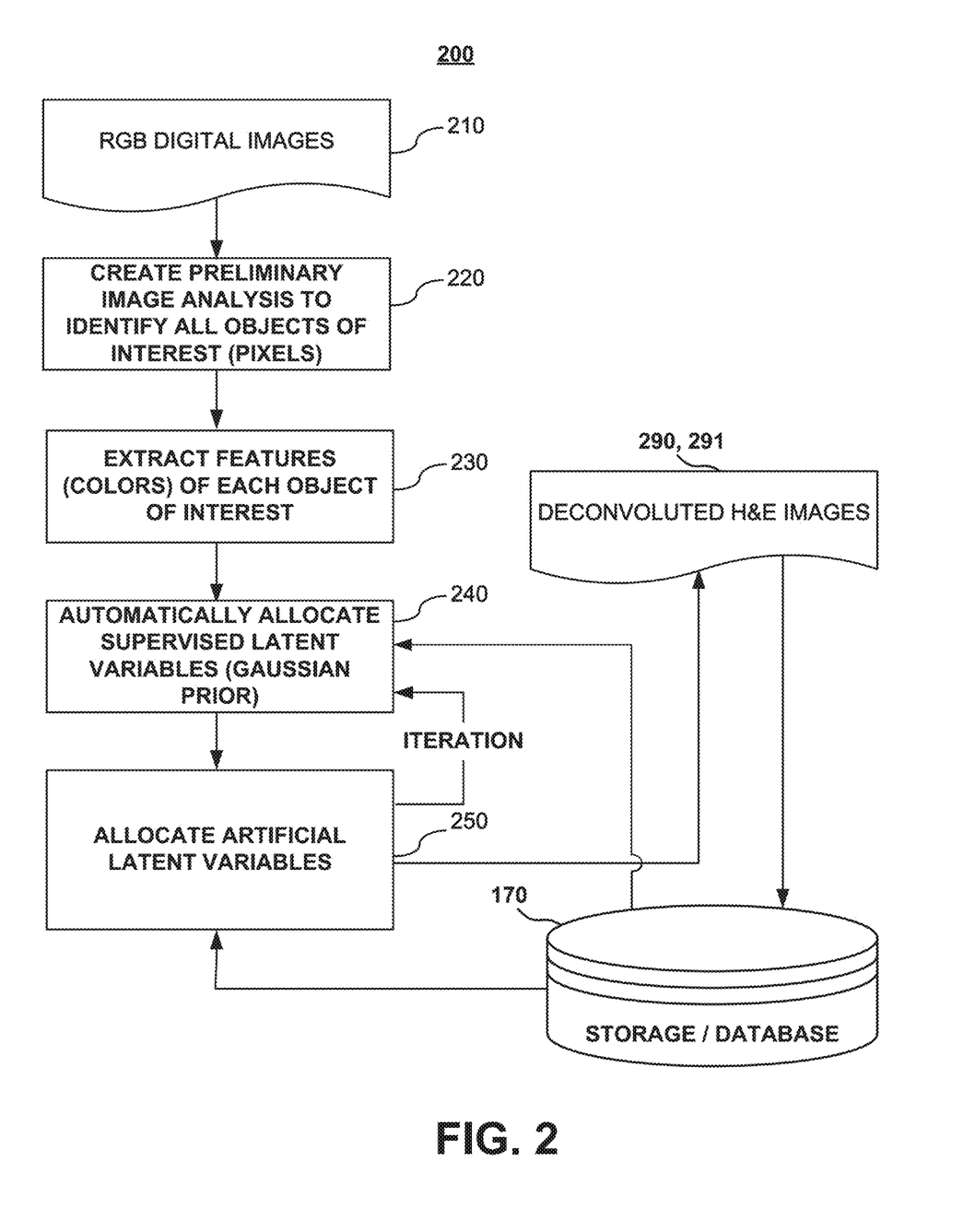
FIG. 2 illustrates a workflow for the deconvolution of an RGB stained image by the tissue analysis system of FIG. 1, into two H&E images in accordance with an exemplary embodiment of the subject disclosure.

With further reference to FIG. 2, the workflow 200 can input a set of RGB digital images 210 with stained tissue sections to the analysis system 100 via the imaging module 110. An automated, semi-automated, or interactive image analysis method or algorithm may be used at step 220 to detect every object of interest, e.g., every pixel, in the RGB digital images 210.

At step 230, the feature extraction module 130 can be executed to extract the desired quantitative feature, such as the color of each pixel (step 230). Based on the extracted features, the module 140 uses prior knowledge of stain variability that may be stored in the storage or database 170 in order to supervise the latent variables (step 240). As explained earlier, module 140 may iteratively apply the Gaussian prior in two successive E then M steps, using an Expectation-Maximization (EM) algorithm. These two steps will continue to be iteratively applied, starting with the E-step, until convergence is attained, at which time the iterations are terminated.

Figure 3:
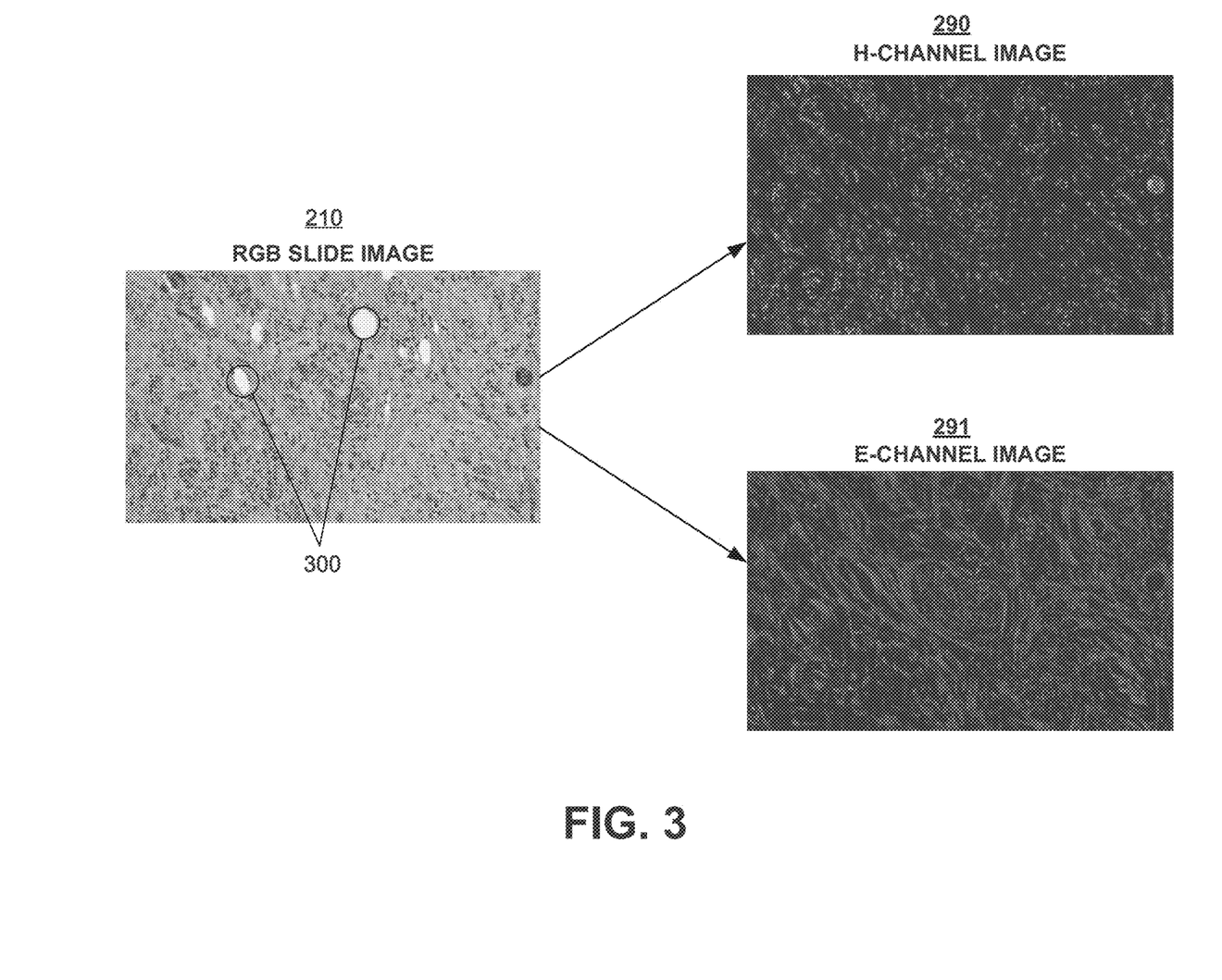
FIG. 3 depicts an illustration of the deconvolution of the RGB image into H&E images (or components) in accordance with an exemplary embodiment of the present disclosure.

At step 250, the module 150 of the analysis system 100 allocates artificial latent variables to suspect heterogenous objects 300 by creating an artificial latent variable residue or 'Resi' whose reference probability is defined as a cross-product of E and H. The resulting deconvoluted H&E images 290, 291 are then rendered and stored in the storage or database 170, for assessment or processing.

In each of the flow charts described herein, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, the use of a specific sequence of steps is not meant to imply any limitations on the invention. Changes may be made with regards to the sequence of steps without departing from the spirit or scope of the present disclosure. The use of a particular sequence is therefore, not to be taken in a limiting sense, and the scope of the present disclosure is defined only by the appended claims.

As it will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

As it will be further appreciated, the processes in embodiments of the present disclosure may be implemented using any combination of software, firmware or hardware. As a preparatory step to practicing the present disclosure in software, the programming code (whether software or firmware) will typically be stored in one or more computer readable storage mediums for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the present disclosure may be practiced by combining one or more machine-readable storage devices containing the code according to the present disclosure with appropriate processing hardware to execute the code contained therein. An apparatus for practicing the present disclosure could be one or more processing devices and storage systems containing or having network access to program(s) coded in accordance with the present disclosure.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Thus, it is important that while illustrative embodiments of the present disclosure are descrbed in the context of a fully functional computer (server) system with installed (or executed) software, those skilled in the art will appreciate that the software aspects of the illustrative embodiments of the present disclosure are capable of being distributed as a program product in a variety of forms, and that an illustrative embodiment of the present disclosure applies equally regardless of the particular type of media used to actually carry out the distribution.

In addition, while the present disclosure has been described with reference to exemplary embodiments, 't will be understood by those skilled in the art that various changes may be made and equivalents may be substituted for elements thereof without departing from the scope of the present disclosure. Furthermore, many modifications may be made to adapt a particular system, device or component thereof to the teachings of the present disclosure without departing from the essential scope thereof. Therefore, it is intended that the present disclosure not be limited to the particular embodiments disclosed for carrying out this present disclosure, but that the present disclosure will include all embodiments falling within the scope of the appended claims.

As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another. In addition, listing terms such as "a", "b", c", "first", "second", and "third" are used herein and in the appended claims for purposes of description and are not intended to indicate or imply relative importance or significance.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

What is claimed is:

1. A method comprising:
receiving a multi-color channel image of a biological specimen that is stained using a staining system;
detecting one or more image objects within the multi-color channel image;
extracting features from the one or more image objects;
using the extracted features and stain variability data corresponding to the staining system to assign a Gaussian prior, wherein the stain variability data is accessed from a database and comprises known characteristics of each stain of a plurality of stains;
estimating reference stain vectors based on the assigned Gaussian prior and a probabilistic latent variable model; and
based on the it estimated reference stain vectors,
deconvoluting the multi-color channel image into at least two constituent stain component images.

2. The method of claim 1, wherein the reference stain vectors are estimated by iteratively applying the assigned Gaussian prior in a successive E step and M step of an Expectation-Maximization (EV) model.

3. The method of claim 2, wherein the assigned Gaussian prior is iteratively applied until the successive E step and M step converge.

4. The method of claim 1, further comprising allocating artificial latent variables, wherein allocating the artificial latent variables includes defining an artificial latent variable residue (Desi) as a cross-product of a first stain vector and a second stain vector such that a vector that is independent of the first and second stain vectors is generated.

5. The method of claim 4, wherein the first stain vector comprises a hematoxylin vector and the second stain vector comprises an eosin vector.

6. The method of claim 1, wherein:
a first constituent stain component image of the at least two constituent stain component images is a Hematoxylin (H-channel) image; and
a second constituent stain component image of the at least two constituent stain component images an Eosin (E-channel) image.

7. A non-transitory computer-readable medium including instructions which, when executed by one or more processors of a tissue analysis system, cause the tissue analysis system to perform the operations of:
receiving a multi-color channel image of a biological specimen that is stained using a staining system;
detecting one or more image objects within the multi-color channel image;
extracting features from the one or more image objects;
using the extracted features and stain variability data corresponding to the staining system to assign a Gaussian prior, wherein the stain variability data is accessed from a database and comprises known characteristics of each stain of a plurality of stains;
estimating reference stain vectors based on the assigned Gaussian prior and a probabilistic latent variable model; and
based on the estimated reference stain vectors,
deconvoluting the multi-color channel image into at least two constituent stain component images.

8. The non-transitory computer-readable medium of claim 7, wherein the reference stain vectors are estimated by iteratively applying the assigned Gaussian prior in a successive E step and M step of an Expectation-Maximization (EM) model.

9. The non-transitory computer-readable medium of claim 8, wherein the assigned Gaussian prior is iteratively applied until the successive E step and M step converge.

10. The non-transitory computer-readable medium of claim 7, wherein the instructions further cause the tissue analysis system to perform the operations of:
allocating artificial latent variables, wherein allocating the artificial latent variables includes defining an artificial latent variable residue (Resi) as a cross-product of a first stain vector and a second stain vector such that a vector that is independent of the first and second stain vectors is generated.

11. The non-transitory computer-readable medium of claim 10, wherein the first stain vector comprises a hematoxylin vector and the second stain vector comprises an eosin vector.

12. The non-transitory computer-readable medium of claim 7, wherein:
a first constituent stain component image of the at least two constituent stain component images is a Hematoxylin (H-channel) image; and
a second constituent stain component image of the at least two constituent stain component images an Eosin (E-channel) image.

13. A tissue analysis system comprising one or more processors and coupled to at least one memory storing instructions which, when executed by the one or more processors, cause the tissue analysis system to perform the operations of:
receiving a multi-color channel image of a biological specimen that is stained using a staining system;

detecting one or more image objects within the multi-color channel image;
extracting features from the one or more image objects;
using the extracted features and stain variability data corresponding to the staining system to assign a Gaussian prior, wherein the stain variability data is accessed from a database and comprises known characteristics of each stain of a plurality of stains;
estimating reference stain vectors based on the assigned Gaussian prior and a probabilistic latent variable model; and
based on the estimated reference stain vectors,
deconvoluting the multi-color channel image into at least two constituent stain component images.

14. The tissue analysis system of claim 11, wherein the reference stain vectors are estimated by iteratively applying the assigned Gaussian prior in a successive E step and M step of an Expectation-Maximization (EM) model.

15. The tissue analysis system of claim 14, wherein the assigned Gaussian prior is iteratively applied until the successive E step and M step converge.

16. The tissue analysis system of claim 13, wherein the instructions further cause the tissue analysis system to perform the operations of:
allocating artificial latent variables, wherein allocating the artificial latent variables includes defining an artificial latent variable residue (Resi) as a cross-product of a first stain vector and a second stain vector such that a vector that is independent of the first and second stain vectors is generated.

17. The tissue analysis system of claim 16, wherein the first stain vector comprises a hematoxylin vector and the second stain vector comprises an eosin vector.

18. The tissue analysis system of claim 13, wherein:
a first constituent stain component image of the at least two constituent stain component images is a Hematoxylin (H-channel) image; and
a second constituent stain component image of the at least two constituent stain component images an Eosin (E-channel) image.

* * * * *